Patented Feb. 17, 1948

2,436,184

UNITED STATES PATENT OFFICE 2,436,184

PHARMACEUTICAL JELLY

William B. Stillman and Albert B. Scott, Norwich, N. Y., assignors to Eaton Laboratories, Inc., Norwich, N. Y., a corporation of New York No Drawing. Application November 8, 1945, Serial No. 627,546

8 Claims. (Cl. 167—58)

The present application is a continuation-in-part of our application Serial No. 518,024, filed January 12, 1944, which has been abandoned in favor of the present application.

This invention relates to a pharmaceutical jelly and aims to provide a jelly of desirable physical properties which will maintain spermicidal effectiveness during long periods of storage.

Vegetable gums have been found to be the most desirable jelly bases, as they give uniformly correct physical qualities and are not subject to deterioration as are starch and some other bases which have been suggested. Phenylmercurial salts, such as phenylmercuric acetate, have been found to be the most effective chemical spermicidal agents.

A jelly having a vegetable gum base containing a phenylmercurial salt as an active spermicidal agent would, therefore, constitute a highly desirable pharmaceutical jelly, but, prior to our invention, it had proved impossible to make a stable jelly of this character. Difficulty arises from the facts that the stability of the mercurial depends upon keeping the jelly slightly alkaline, and that the vegetable gums are not only inherently acid but also have a considerable buffering effect on the acid side. Thus, a vegetable gum jelly which is initially made alkaline by an addition of an alkali to neutralize the acidity of the gum tends on long standing to become distinctly acid so that any mercurial contained in it decomposes.

We have overcome this difficulty by finding and introducing into a vegetable gum jelly an alkaline buffer system whose buffering action is high and sufficient to counteract the acid buffering action of the gum, and thus to maintain the jelly slightly alkaline notwithstanding the normal tendency of such a jelly to become more acid. This buffer system consists of a loose chemical compound or complex formed of borax and a polyhydroxy chemical compound having two OH groups in cis relation on adjacent carbon atoms. In this complex, the borax is the alkaline ingredient and the polyhydroxy compound is the acid ingredient. The buffer capacity of the complex depends upon the amount of borax and may be made much higher than that of any ordinary buffer system, and higher than the acid buffer capacity of vegetable gum. The proportion between the borax and polyhydroxy compound determines the pH value at which the buffer action is exercised.

We have ascertained that buffer capacity sufficient to counteract the acidifying effect of ordinary vegetable gum jellies (containing from three to six per cent. of vegetable gum) may be obtained by using an amount of borax in excess of one per cent. and preferably two or three per cent. The amount of the polyhydroxy compound of the type specified which is required depends upon the specific compound used but may easily be ascertained by the pH value of the combination which should be between 7 and 8 and preferably about 7.5.

A vegetable gum jelly requires a plasticizer for the vegetable gum and the plasticizers commonly used—glycerine and propylene glycol—are polyhydroxy compounds of the class described for use as the acid ingredient of the buffer system. These compounds will serve at the same time as a plasticizer for the vegetable gum and a part of the buffer system. At the same time, other polyhydroxy compounds of the class specified which have no plasticizing action may be used as part of the buffer system. As the jelly is of an aqueous character, it is of course necessary to use polyhydroxy compounds which are water-soluble.

By introducing such a buffer system, we have for the first time produced a vegetable-gum mercurial jelly which retains its activity on long storage. Our new jelly contains a buffer system consisting of borax in excess of one per cent. and one or more water-soluble polyhydroxy compounds with two OH groups in cis relation on adjacent carbon atoms. The polyhydroxy compounds are present in sufficient quantity to form with the borax a buffer system having a pH between 7 and 8. At least a part of the polyhydroxy compounds used serve as plasticizer for the vegetable gum. Specific examples of such jellies are the following:

Example I

| | Parts by weight |
|---|---|
| Vegetable gum: | |
|    Gum tragacanth | 1.8 |
|    Purified Irish moss | 2.0 |
| Active spermicidal agent: | |
|    Phenylmercuric acetate | 0.05 |
| Borax | 3.0 |
| Polyhydroxy compound: | |
|    Glycerine | 8.0 |
| Wetting and preserving agents: | |
|    Polyethylene glycol of mono-iso-octyl phenyl ether (33⅓% sol. in water) | 1.0 |
|    Methyl p-hydroxy benzoate | 0.05 |
| Water | 84.1 |
| | 100.0 |

Example II

| | Parts by weight |
|---|---|
| Vegetable gum: | |
| Gum tragacanth | 1.8 |
| Purified Irish moss | 1.2 |
| Active spermicidal agent: | |
| Phenylmercuric acetate | 0.05 |
| Borax | 2.0 |
| Polyhydroxy compound: | |
| Glycerine | 7.0 |
| Wetting and preserving agents: | |
| Polyethylene glycol of mono-iso-octyl phenyl ether (33⅓% sol. in water) | 0.3 |
| Methyl p-hydroxy benzoate | 0.05 |
| Water | 87.6 |
| | 100.0 |

Example III

| | Parts by weight |
|---|---|
| Vegetable gum: | |
| Gum acacia | 3.0 |
| Purified Irish moss | 2.5 |
| Active spermicidal agent: | |
| Phenylmercuric nitrate | 0.05 |
| Borax | 3.0 |
| Polyhydroxy compound: | |
| Glycerine | 8.0 |
| Wetting and preserving agents | 0.35 |
| Water | 83.1 |
| | 100.0 |

Example IV

| | Parts by weight |
|---|---|
| Vegetable gum: | |
| Gum tragacanth | 1.8 |
| Purified Irish moss | 1.2 |
| Active spermicidal agent: | |
| Phenyl mercuric glycollate | 0.05 |
| Borax | 3.0 |
| Polyhydroxy compounds: | |
| Glycerine | 6.0 |
| Glucose (dextrose) | 2.0 |
| Wetting and preserving agents | 0.35 |
| Water | 85.6 |
| | 100.0 |

Example V

| | Parts by weight |
|---|---|
| Vegetable gum: | |
| Gum tragacanth | 1.8 |
| Purified Irish moss | 1.2 |
| Active spermicidal agent: | |
| Phenylmercuric acetate | 0.05 |
| Borax | 3.0 |
| Polyhydroxy compounds: | |
| Propylene glycol | 8.0 |
| Sorbitol | 4.0 |
| Wetting and preserving agents | 0.35 |
| Water | 81.6 |
| | 100.0 |

Our invention is by no means limited to the specific examples given, as other formulae embodying our invention as hereinabove disclosed may be easily worked out by those skilled in the art. While all the examples given constitute effective spermicidal jellies which remain active after long periods of storage, we prefer Example I because of its simplicity and because the alkaline buffer system which it contains has an alkaline buffer capacity sufficient to neutralize the acid buffer capacity of the gums with a substantial factor of safety.

What is claimed is:

1. A jelly having a vegetable gum base and containing a small percentage of a phenyl-mercurial salt, and a buffer system consisting of borax and at least one material of the group consisting of water-soluble polyhydroxy compounds with two OH groups in cis relation on adjacent carbon atoms and mixtures of such compounds, the ratio between the amount of borax and the amount of said polyhydroxy material being such that the buffer system has a pH between 7 and 8, and at least a part of said material serving as a plasticizer for the vegetable gum.

2. A jelly having a vegetable gum base and containing a small percentage of a phenyl-mercurial salt, and a buffer system consisting of borax in an amount in excess of one per cent. of the jelly and at least one material of the group consisting of water-soluble polyhydroxy compounds with two OH groups in cis relation on adjacent carbon atoms and mixtures of such compounds, said polyhydroxy material being present in an amount sufficient to form with the borax a buffer system having a pH between 7 and 8, and at least a part of said material serving as a plasticizer for the vegetable gum.

3. A jelly having a vegetable gum base and containing a small percentage of a phenyl-mercurial salt, and a buffer system consisting of borax amounting to from two to three per cent. of the jelly and at least one material of the group consisting of water-soluble polyhydroxy compounds with two OH groups in cis relation on adjacent carbon atoms and mixtures of such compounds, said polyhydroxy material being present in an amount sufficient to form with the borax a buffer system having a pH of about 7.5, and at least a part of said material serving as a plasticizer for the vegetable gum.

4. A jelly having a vegetable gum base and containing a small percentage of a phenyl-mercurial salt, and a buffer system consisting of borax and glycerine in such ratio that the buffer system has a pH between 7 and 8, the glycerine serving also as a plasticizer for the vegetable gum.

5. A jelly having a vegetable gum base and containing a small percentage of a phenyl-mercurial salt, and a buffer system consisting of borax in an amount in excess of one per cent. of the jelly and glycerine in an amount sufficient to form with the borax a buffer system having a pH between 7 and 8, the glycerine serving also as a plasticizer for the vegetable gum.

6. A jelly comprising vegetable gum, 3 to 6%, a phenylmercurial salt about .05%, borax about 3%, glycerine about 8%, and water about 85%.

7. A jelly comprising vegetable gum about 3%, a phenylmercurial salt about .05%, borax about 3%, glycerine and sugar about 8%, and water about 85%.

8. A jelly comprising vegetable gum about 3%, a phenylmercurial salt about .05%, borax about 3%, propylene glycol and sorbitol about 12%, and water about 81%.

WILLIAM B. STILLMAN.
ALBERT B. SCOTT.

REFERENCES CITED

The following references are of record in the file of this patent:

Eastman et al., Human Fertility, June 1944, pages 33–42. (Div. 43.)

Becker et al., Human Fertility, Mar. 1944, pages 6–11. (Div. 43.)

Baker et al., The Journal of Contraception, Oct. 1939, pages 192, 193. (Copy in Div. 43.)